United States Patent [19]
Martin et al.

[11] Patent Number: 5,645,401
[45] Date of Patent: Jul. 8, 1997

[54] AXIAL FAN FOR A RADIATOR OF A MOTOR VEHICLE ENGINE

[75] Inventors: Hans Martin, Stuttgart; Uwe Blass, Möglingen, both of Germany

[73] Assignee: Behr GmbH & Co., Stuttgart, Germany

[21] Appl. No.: 572,625

[22] Filed: Dec. 14, 1995

[30] Foreign Application Priority Data

Dec. 21, 1994 [DE] Germany .................. 44 45 671.9

[51] Int. Cl.⁶ .................................................. F04D 29/34
[52] U.S. Cl. .................. 416/169 A; 416/189; 416/244 R
[58] Field of Search .......................... 416/93 R, 169 A, 416/189 R, 244 R

[56] References Cited

U.S. PATENT DOCUMENTS

| | | | |
|---|---|---|---|
| 3,622,249 | 11/1971 | Hayashi et al. | 416/244 |
| 3,642,382 | 2/1972 | Hayashi | 416/169 A |
| 4,169,693 | 10/1979 | Brubaker | 416/93 R |
| 4,487,551 | 12/1984 | Mizutani et al. | 416/169 A |
| 5,193,981 | 3/1993 | Scheidel et al. | 416/169 A |
| 5,236,306 | 8/1993 | Hozak | 416/93 A |

FOREIGN PATENT DOCUMENTS

| | | | |
|---|---|---|---|
| 1247081 | 8/1967 | Germany . | |
| 24 01 462 | 7/1975 | Germany . | |
| 3304296 | 9/1983 | Germany | 416/93 R |
| 3840455A1 | 6/1989 | Germany . | |
| 1 444 422 | 7/1976 | United Kingdom . | |

*Primary Examiner*—Edward K. Look
*Assistant Examiner*—Mark Sgantzos
*Attorney, Agent, or Firm*—Evenson McKeown Edwards & Lenahan, PLLC

[57] ABSTRACT

An axial fan is known whose fan hub is fastened by means of a fan flange on a clutch housing of a fluid friction clutch while leaving an annular gap for a partial flow assigned to the cooling fins of the clutch housing. In the case of such axial fans, swirls occur in the hub area which reduce the efficiency of the fan. According to the invention, for achieving an improved efficiency, an air guiding ring is provided on the fan hub on an inlet side relating to a flow direction of the venting flow, which air guiding ring has a curved profile which is directed axially opposite to the flow direction and is curved radially to the inside.

8 Claims, 1 Drawing Sheet

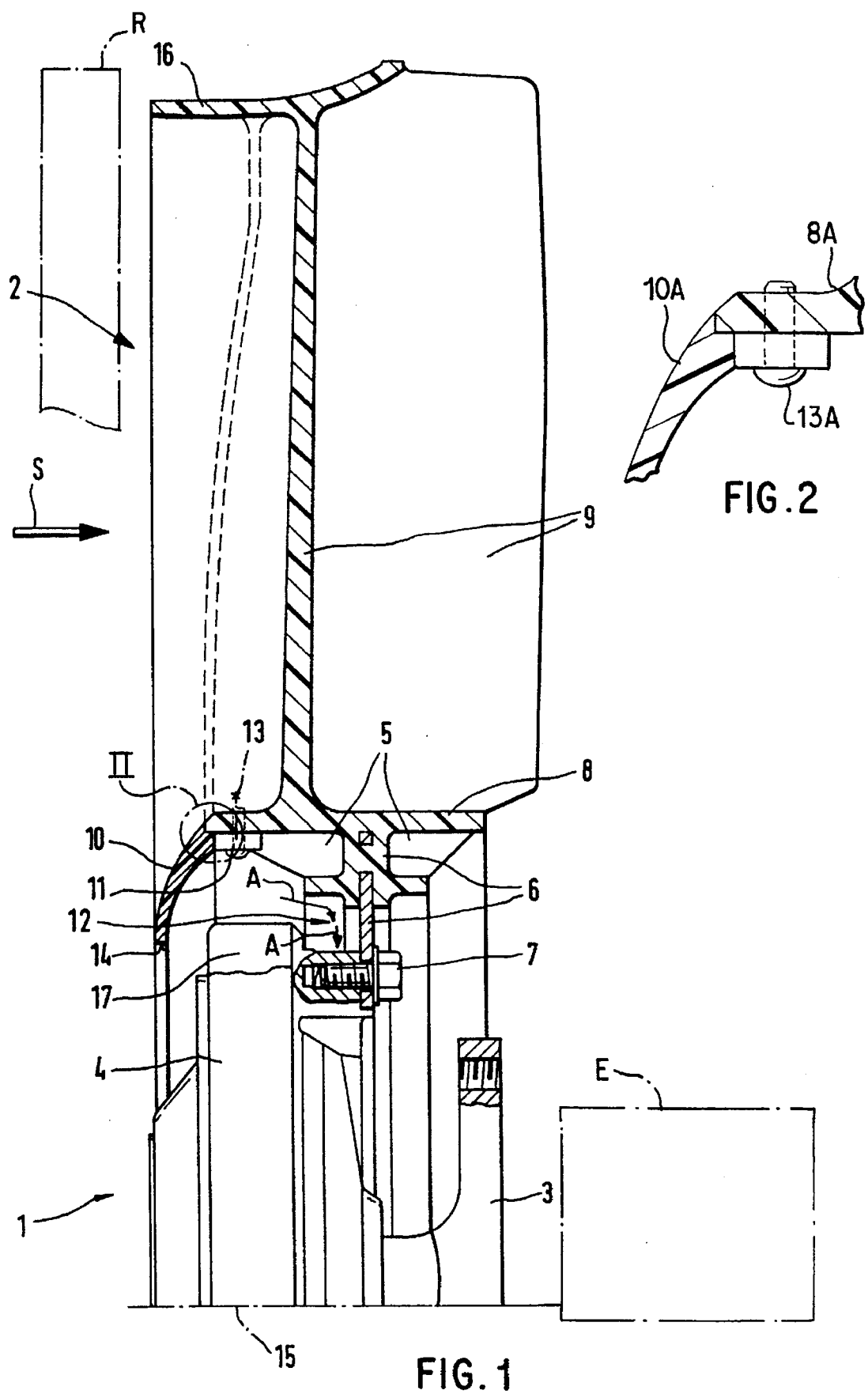

AXIAL FAN FOR A RADIATOR OF A MOTOR VEHICLE ENGINE

BACKGROUND AND SUMMARY OF THE INVENTION

This invention relates to an axial fan for a radiator of a motor vehicle engine whose fan hub is fastened by means of a fan flange while leaving an annular gap on a clutch housing of a fluid friction clutch which can be driven by a driving part of the motor vehicle engine.

Axial fans are known which rotate at low speeds of motor vehicles for ventilating the radiator of a coolant circulating system of the motor vehicle. By means of a fluid friction clutch, such axial fans are driven directly by the motor vehicle engine. For the transmission of force, either a V-belt is used, or the driving part of the fluid friction clutch is mounted directly on the crankshaft of the motor vehicle engine. The fluid friction clutch has a clutch housing whose outer edge is provided with radially projecting cooling fins. A fan hub of the axial fan encloses the clutch housing radially on the outside and is rigidly fastened on the clutch housing. In order to permit a flow around the cooling fins of the clutch housing, an annular gap is provided between the fan hub and the clutch housing. As a result of the annular gap between the fan hub and the clutch housing, however, return flows and swirls frequently occur in the operation of the axial fan which have a negative influence on the flow conditions of the axial fan and thus reduce the efficiency of the axial fan.

It is an object of the invention to provide an axial fan of the initially mentioned type which is improved fluidically.

This object is achieved according to preferred embodiments of the invention in that, on the fan hub, an air guiding ring is provided on an inlet side relating to the flow direction of the air flow, which air guiding ring has a curved profile which is directed axially opposite to the flow direction and is curved radially toward the inside. As a result, an improved distribution of the air guiding is achieved. On the one hand, the air guiding of the main flow takes place by the providing of an air guiding ring radially on the outside along the fan hub and past the blades of the axial fan. On the other hand, by means of the air guiding ring, the air guiding of an auxiliary flow takes place for cooling the cooling fins of the clutch housing in a targeted manner between the clutch housing and the fan hub without any generating of return flows or swirls. As a result, swirl areas in the hub range of the axial fan are reduced whereby a pressure equilibrium can be created. In addition, an increase of the efficiency of the axial fan is achieved.

As a further development of the invention, a forward facing front edge of the air guiding ring is arranged at an axial distance to an outer edge of the clutch housing, and this front edge projects beyond the outer edge radially to the inside. As a result, the "spoiler effect" of the air guiding ring is further improved.

In a further development of the invention, the air guiding ring is a component which is separate from the fan hub and which is detachably fastened on the fan hub. As a result, it is possible to attach the air guiding ring as an additional part to existing axial fans without any high expenditures. The detachable fastening of the air guiding ring nevertheless ensures a simple removal of the fluid friction clutch from the fan hub.

In a further development of the invention, the air guiding ring has several fastening projections which are distributed along its circumference and which adjoin the fan hub radially from the inside and project axially between the reinforcing fins of the fan hub. Particularly fastening brackets are suitable as the fastening projections. By means of this further development, it is possible to connect the air guiding ring by means of a simple fastening of the fastening brackets on the fan hub rigidly with this fan hub. Advantageously, an undetachable detent connection is provided for this purpose.

Other objects, advantages and novel features of the present invention will become apparent from the following detailed description of the invention when considered in conjunction with the accompanying drawings.

BRIEF DESCRIPTION OF THE DRAWINGS

FIG. 1 is a sectional view of an embodiment of an axial fan according to the invention, having a fan hub mounted on a clutch housing of a fluid friction clutch and provided with an air guiding ring; and FIG. 2 is a schematic view of Section II from FIG. 1, showing a modified fastening arrangement of the air guiding ring.

DETAILED DESCRIPTION OF THE DRAWINGS

In a manner which is not shown in detail, the axial fan 1, 2 is arranged in a motor vehicle in the driving direction behind a coolant radiator R of a coolant circulating system for a motor vehicle engine E. At low speeds of the vehicle or during stoppage, the axial fan 1, 2 generates a suction flow (S) for the coolant radiator R because of the arrangement behind the coolant radiator R, whereby air flows through the coolant radiator R. The axial fan 1, 2 has a fluid friction clutch 1 which is connected by means of a flange shaft 3 to a crankshaft of the motor vehicle engine E. The motor vehicle engine is a large truck engine E. In the case of small motor vehicle engines, the flange shaft 3 serving as the driving part is not driven directly by the crankshaft but is driven by means of V-belts by the motor vehicle engine E. The output part of the fluid friction clutch 1 is formed by a clutch housing 4 whose outer circumference is provided with cooling fins 17 which project radially toward the outside.

A fan wheel 2 of the axial fan 1, 2 has a fan hub 8 which radially encloses the clutch housing 4 and which is fastened on the clutch housing 4 by means of an annular fan flange ring 6R which is fixed to the fan hub 8 in a slot 6S as shown. The fan hub 8 is reinforced by reinforcing ribs 5 circumferentially spaced from one another around the circumference of the fan hub 8. For the fastening of the fan hub 8 on the clutch housing 4, the fan flange 6R is bolted together with the clutch housing 4 by means of three to five axially aligned fastening screws 7 disposed symmetrically around the circumference of fan flange ring 6. Between the fan hub 8 with flange ring 6 and the clutch housing 4, an annular gap 12 remains through which air flows (arrows A) while flowing around the cooling fins 17. In order to obtain a pressure equilibrium in the area of the fan hub 8 and largely defined flow conditions in the case of the axial fan 1, 2, on an inlet side of the fan hub 8 relating to the air flow (S) which faces the coolant radiator, an air guiding ring 10 is provided which, in the embodiment shown, is made of a plastic material. The air guiding ring 10 represents a component which is separate from the fan wheel 2 and which is attached to the inlet-side front side of the fan hub 8 and is detachably connected with it. In the case of an embodiment of the invention which is not shown, the air guiding ring 10 represents no separate component but is an integral part of the fan hub 8.

The air guiding ring 10 has a curved profile which is curved from the front side of the fan hub 8 in the direction of the coolant radiator axially toward the front and radially inwardly—relative to an axis of rotation 15 of the axial fan 1, 2. The air guiding ring 10 has an interior front edge 14 which is arranged at an axial distance in front of the cooling fins 17 of the clutch housing 4. The air guiding ring 10 is attached radially from the inside to the fan hub 8 in the area of its inlet-side front side, in which case a surface forming the air guiding surface for the main flow connects in a flush and aligned manner to the front side of the fan hub 8. By means of this uniform transition, a detaching of the flow is avoided in the inlet area of the fan hub 8. The air guiding ring 10 has four fastening brackets 11 as fastening projections which are uniformly distributed along its circumference and which rest against the fan hub 8 on the interior side of the fan hub 8. The number of fastening brackets is not important. In other embodiments according to the invention, arrangements of fastenings brackets are provided in different numbers with six to eight such brackets in certain preferred embodiments. The dimensions of these fastening brackets are adapted to the spacing of two adjacent reinforcing ribs 5 with respect to one another in such a manner that the fastening brackets 11 can in each case be slid in between two reinforcing ribs 5. The fastening bracket 11 is screwed to the fan hub 8 by means of a fastening screw 13, in which case each fastening screw 13 is screwed radially from the outside through the fan hub 8 and into the respective fastening screw 11. In other embodiments of the invention, other types of fastenings are provided for the air guiding ring 10. In a preferred embodiment depicted in FIG. 2, the fastening projections of the air guiding ring 10A are connected with the fan hub 8A by means of undetachable detent connections 13A.

The illustrated embodiment of FIG. 1 has a detachable fastening of the air guiding ring 10 because, for a demounting of the fluid friction clutch 1 from the fan wheel 2, the air guiding ring 10 must be removed first. This is true because, in the case of the embodiment shown, the front edge 14 reaches over the outer circumference of the clutch formed by the cooling fins 17 by a small amount radially toward the inside. However, undetachable fastenings of the air guiding ring 10 on the fan hub 8 are also contemplated where the fluid friction clutch 11 is designed to be demounted in the opposite direction or the front edge of the air guiding ring does not hinder the demounting of the clutch.

By means of the air guiding ring 10, defined air guidings are obtained for the fan as well as a pressure equilibrium in the annular gap 12 because, by means of the air guiding ring 10 counterflows and swirls in the area of the fan hub 8 and of the clutch are avoided. In a known manner, the fan wheel 2 represents a ducted fan which has a jacket 16 enclosing the fan blades 9 radially on the outside. The fan wheel 2, including the fan hub 8, the fan blades 9 and the jacket 16 are made in one piece from a plastic material.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Axial fan for a motor vehicle system having a radiator and a motor vehicle engine drivingly connected with a fluid friction clutch, comprising:

a fan hub carrying radially outwardly extending fan blades defining a path for main cooling air flow for cooling and traversing the radiator when in an in use position on a vehicle, said fan hub being connectable with a clutch housing in such a manner as to accommodate a secondary cooling air flow radially inwardly of the hub and over the clutch housing, and an air guiding ring at an air inlet side of the fan hub which extends with a curved profile radially inwardly and forwardly of the fan hub to thereby separate and guide the main and secondary cooling air flows.

2. Axial fan according to claim 8, wherein a forward front edge of the air guiding ring is arranged at an axial distance from an exterior edge of the clutch housing and radially projects beyond the exterior edge toward the inside.

3. Axial fan according to claim 2, wherein the air guiding ring is a component which is separate from the fan hub and is detachably fastened on the fan hub.

4. Axial fan according to claim 3, wherein the air guiding ring has several fastening protections which are distributed along its circumference and adjoin the fan huh radially from the inside and project axially between reinforcing ribs of the fan hub.

5. Axial fan according to claim 4, wherein the fastening projections are locked with the fan hub by means of detent devices.

6. Axial fan according to claim 1, wherein the air guiding ring is integrally formed with the fan hub.

7. Axial fan according to claim 2, wherein the air guiding ring is integrally formed with the fan hub.

8. Axial fan according to claim 1, wherein, in use, the clutch housing includes cooling air ribs on its outer radial circumference which project into the secondary cooling air flow.

* * * * *